US011521396B1

(12) United States Patent
Jain et al.

(10) Patent No.: US 11,521,396 B1
(45) Date of Patent: Dec. 6, 2022

(54) PROBABILISTIC PREDICTION OF DYNAMIC OBJECT BEHAVIOR FOR AUTONOMOUS VEHICLES

(71) Applicant: UATC, LLC, San Francisco, CA (US)

(72) Inventors: Ajay Jain, Toronto (CA); Sergio Casas, Toronto (CA); Renjie Liao, Toronto (CA); Yuwen Xiong, Toronto (CA); Song Feng, San Francisco, CA (US); Sean Segal, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 363 days.

(21) Appl. No.: 16/777,108

(22) Filed: Jan. 30, 2020

Related U.S. Application Data

(60) Provisional application No. 62/949,101, filed on Dec. 17, 2019, provisional application No. 62/800,435, filed on Feb. 2, 2019.

(51) Int. Cl.
| | | |
|---|---|---|
| *G06V 20/58* | (2022.01) | |
| *G06K 9/62* | (2022.01) | |
| *B60W 30/09* | (2012.01) | |
| *G06N 20/00* | (2019.01) | |
| *G05D 1/00* | (2006.01) | |

(52) U.S. Cl.
CPC .............. *G06V 20/58* (2022.01); *B60W 30/09* (2013.01); *G05D 1/0088* (2013.01); *G06K 9/6277* (2013.01); *G06N 20/00* (2019.01); *G05D 2201/0213* (2013.01)

(58) Field of Classification Search
CPC ..... G06V 20/58; B60W 30/09; G05D 1/0088; G05D 2201/0213; G06K 9/6277; G06N 20/00
See application file for complete search history.

(56) References Cited

U.S. PATENT DOCUMENTS

| | | | |
|---|---|---|---|
| 9,760,806 B1 * | 9/2017 | Ning | ........................ G06T 7/277 |
| 2018/0348346 A1 * | 12/2018 | Vallespi-Gonzalez | ........................ G01S 13/865 |
| 2019/0049987 A1 * | 2/2019 | Djuric | ................... G05D 1/0276 |
| 2019/0145765 A1 * | 5/2019 | Luo | ....................... G06V 10/454 702/153 |

OTHER PUBLICATIONS

Aoude, G.S., Luders, B.D., Joseph, J.M. et al. Probabilistically safe motion planning to avoid dynamic obstacles with uncertain motion patterns. Auton Robot 35, 51-76 (2013). https://doi.org/10.1007/s10514-013-9334-3 (Year: 2013).*

(Continued)

*Primary Examiner* — Marthe Y Marc-Coleman
(74) *Attorney, Agent, or Firm* — Dority & Manning, P.A.

(57) ABSTRACT

Systems and methods are described that probabilistically predict dynamic object behavior. In particular, in contrast to existing systems which attempt to predict object trajectories directly (e.g., directly predict a specific sequence of well-defined states), a probabilistic approach is instead leveraged that predicts discrete probability distributions over object state at each of a plurality of time steps. In one example, systems and methods predict future states of dynamic objects (e.g., pedestrians) such that an autonomous vehicle can plan safer actions/movement.

20 Claims, 8 Drawing Sheets

(56) References Cited

OTHER PUBLICATIONS

Alahi et al., "Social LSTM: Human Trajectory Prediction in Crowded Spaces", IEEE/Computer Society Conference on Computer Vision and Pattern Recognition (CVPR 2016), Jun. 26-Jul. 1, 2016, Las Vegas, NV, pp. 961-971.

Bajcsy et al., "A Scalable Framework for Real-Time Multi-Robot, Multi-Human Collison Avoidance", arXiv:1811.05929v1, Nov. 14, 2018, 8 pages.

Bansal et al., "ChauffeurNet: Learning to Drive by Imitating the Best and Synthesizing the Worst", arXiv: 1812.03079v1, Dec. 7, 2018, 20 Pages.

Becker et al., "An Evaluation of Trajectory Prediction Approaches and Notes on the TrajNet Benchmark" arXiv:1805.07663v6, Aug. 16, 2018, 11 pages.

Bishop, "Mixture Density Networks", Aston University, Technical Report, 1994, 26 pages.

Casas et al., "IntentNet: Learning to Predict Intention from Raw Sensor Data", Conference on Robot Learning (CoRL 2018), Oct. 29-31, 2018, Zurich, Switzerland, 10 pages.

Cui et al., "Multimodal Trajectory Predictions for Autonomous Driving using Deep Convolutional Networks", arXiv:1809.10732v1, Sep. 18, 2018, 7 pages.

Djuric et al., "Motion Prediction of Traffic Actors for Autonomous Driving using Deep Convolutional Networks", arXiv:1808.05819v1, Aug. 17, 2018, 10 pages.

Fisac et al., "Probabilistically Safe Robot Planning with Confidence-Based Human Predictions", arXiv:1806.00109v1, May 31, 2018, 9 pages.

Guo et al., "On Calibration of Modem Neural Networks", The 34th International Conference on Machine Learning, Aug. 6-11, 2017, Sydney, Australia, 10 pages.

Gupta et al., "Social GAN: Socially Acceptable Trajectories with Generative Adversarial Networks", IEEE/CVF Conference on Computer Vision and Pattern Recognition (CVPR 2018), Jun. 18-22, 2018, Salt Lake City, Utah, pp. 2255-2264.

He et al., "Deep Residual Learning for Image Recognition", IEEE/Computer Society Conference on Computer Vision and Pattern Recognition (CVPR 2016), Jun. 26-Jul. 1, 2016, Las Vegas, NV, pp. 770-778.

Huang et al., "Arbitrary Style Transfer in Real-time Adaptive Instance Normalization", ICCV 2017 International Conference on Computer Vision, Oct. 22-29, 2017, Venice Italy, pp. 1501-1510.

Kingma et al., "Adam: A Method for a Stochastic Optimization", arXiv:1412.6980v8, Jul. 23, 2015, 15 pages.

Liang et al., "Deep Continuous Fusion for Multi-Sensor 3D Object Detection", European Conference on Computer Vision, Sep. 8-14, 2018, Munich, Germany, 16 pages.

Lin et al., "Feature Pyramid Networks for Object Detection", IEEE Computer Society Conference on Computer Vision and Pattern Recognition (CVPR 2017), Jul. 21-26, 2017, Honolulu, HI, pp. 2117-2125.

Liu et al., "An Intriguing Failing of Convolutional Neural Networks and the CoordConv Solution", 32nd Annual Conference on Neural Information Processing Systems (NeurIPS), Dec. 2-8, 2018, Montreal, Canada, 12 pages.

Luo et al., "Fast and Furious: Real Time End-to-End 3d Detection, Tracking and Motion Forecasting With a Single Convolutional Net", IEEE Computer Society Conference on Computer Vision and Pattern Recognition (CVPR 2018), Jun. 18-22, 2018, Salt Lake City, Utah, pp. 3569-3577.

Ma et al., "Forecasting Interactive Dynamics of Pedestrians With Fictitious Play", IEEE Computer Society Conference on Computer Vision and Pattern Recognition, Jul. 21-26, 2017, Honolulu, HI, pp. 774-782.

Rehder et al., "Goal-Directed Pedestrian Prediction", 2015 IEEE International Conference on Computer Vision Workshops, Dec. 7-13, 2015, Santiago, Chile, pp. 50-58.

Rehder et al., "Pedestrian Prediction by Planning Using Deep Neural Networks", arXiv:1706.05904v2, Jun. 20, 2017, 9 pages.

Rezende et al, "Variational Inference with Normalizing Flows", International Conference on Machine Learning, Jul. 7-9, 2015, Lille, France, 9 pages.

Ridel et al., "A Literature Review on the Prediction of Pedestrian Behavior in Urban Scenarios", 21st International Conference on Intelligent Transportation Systems (ITSC), Nov. 4-7, 2018, Maui, HI, pp. 3105-3112.

Rudenko et al., "Human Motion Trajectory Prediction: A Survey", arXiv:1905.06113v3, Dec. 17, 2019, 37 pages.

Sadeghian et al., "SoPhie: An Attentive GAN for Predicting Paths Compliant to Social and Physical Constraints", IEEE/CVF Conference on Computer Vision and Pattern Recognition (CVPR 2019), Jun. 16-20, 2019, Long Beach, CA, pp. 1349-1358.

Saleh et al., "Long-Term Recurrent Predictive Model for Intent Prediction of Pedestrians via Inverse Reinforcement Learning", Digital Image Computing: Techniques and Application (DICTA 2018), Dec. 10-13, 2018, 8 pages.

Shi et al., "Convolutional LSTM Network: A Machine Learning Approach for Precipitation Nowcasting", Neural Information Processing Systems (NIPS 2015), Dec. 7-12, 2015, Montreal, Canada, 9 pages.

Wan et al., "The Unscented Kalman Filter for Nonlinear Estimation", The IEEE 2000 Adaptive Systems for Signal Processing, Communications, and Control Symposium: AS-SPCC, Oct. 1-4, 2000, Lake Loise, Alberta, Canada, 6 pages.

Wu et al., "Probabilistic Map-based Pedestrian Motion Prediction Taking Traffic Participants into Consideration", 2018 IEEE Intelligent Vehicles Symposium, IV 2018, Jun. 26-30, 2018, Changshu, Suzhou, China, 8 pages.

Yang et al., "HDNET: Exploiting HD Maps for 3D Object Detection", 2nd Conference on Robot Learning, Oct. 29-31, 2018, Zurich, Switzerland, 10 pages.

Ziebart et al., "Planning-based Prediction for Pedestrians", 2009 IEEE/RSJ International Conference on Intelligent Robots and Systems, Oct. 11-15, 2009, St. Louis, MO, 6 pages.

Zyner et al., "Naturalistic Driver Intentions and Path Prediction using Recurrent Neural Networks", arXiv:1807.09995v1, Jul. 26, 2018, 10 pages.

\* cited by examiner

PROBABILISTIC PREDICTION OF DYNAMIC OBJECT BEHAVIOR FOR AUTONOMOUS VEHICLES

RELATED APPLICATIONS

This application claims priority to and benefit of U.S. Provisional Patent Application No. 62/800,435 filed Feb. 2, 2019 and U.S. Provisional Patent Application No. 62/949,101 filed Dec. 17, 2019. U.S. Provisional Patent Application No. 62/800,435 and U.S. Provisional Patent Application No. 62/949,101 are hereby incorporated by reference in their entireties.

FIELD

The present disclosure relates generally to prediction of object locations. In particular, the present disclosure is directed to systems and methods that perform probabilistic dynamic object behavior prediction, for example, in furtherance of autonomous vehicle operation.

BACKGROUND

An autonomous vehicle is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

In particular, autonomous vehicles are required to plan around both static and dynamic objects, applying predictive models of behavior to estimate future locations of the objects in the environment. However, future behavior is inherently uncertain, and models of motion that produce deterministic outputs are limited to short timescales.

More particularly, in order to predict a safe maneuver, an autonomous vehicle can attempt to model the future motion of agents around the vehicle. Most prior work in prediction of vehicle and pedestrian behaviors in the context of autonomous vehicles has modeled actor motion through explicit trajectories over short timescales (e.g., a trajectory that describes a specific series of well-defined locations over time). Long-range trajectory forecasting is challenging as multiple actions are possible and trajectory uncertainty increases rapidly with the time horizon.

Prediction of pedestrian motion is particularly difficult as pedestrians have inherently multi-modal behavior. In contrast to vehicles, pedestrians can easily change direction or goal. Further, pedestrians have weaker interactions with their surroundings than vehicles, as they are not constrained to follow lanes and traffic rules. Instead, they can jaywalk and have multiple paths for a given goal. Pedestrian predictions must also capture relatively unlikely modes of behavior as humans are vulnerable road users.

However, models that predict a trajectory and penalize mean-squared error with respect to true paths only model the conditional average of the posterior and fail to represent unlikely actions. The conditional average trajectory may be infeasible and does not capture unlikely future events that require more cautious planning.

Multi-modality has also been approached in the trajectory framework. To model multiple behaviors, previous work has decoded some representation of observed trajectories to a fixed number of future trajectories or used a sampling approach with losses to increase path diversity. Still, in realistic environments, a large number of samples is needed to model the space of possibilities. This creates a tradeoff between completeness of predictions and latency. Further, predicting explicit trajectories is fundamentally limited over long time horizons due to an exponentially increasing number of possible paths.

SUMMARY

Aspects and advantages of embodiments of the present disclosure will be set forth in part in the following description, or can be learned from the description, or can be learned through practice of the embodiments.

One example aspect of the present disclosure is directed to an object motion prediction system. The object motion prediction system includes one or more processors and one or more non-transitory computer-readable media that collectively store: a machine-learned object motion prediction model configured to generate probabilistic predictions for object motion over a plurality of time steps, wherein the machine-learned object motion prediction model comprises a backbone portion and a prediction head; and instructions that, when executed by the one or more processors, cause the object motion prediction system to perform operations. The operations include obtaining a scene rasterization that describes a scene that includes a dynamic object; processing the scene rasterization with the backbone portion of the machine-learned object motion prediction model to generate a feature map; and processing the feature map with the prediction head of the machine-learned object motion prediction model to generate a plurality of probabilistic predictions respectively for the plurality of time steps, wherein the probabilistic prediction generated for each time step provides a respective probability distribution for a respective future location of the dynamic object at such time step.

Another example aspect of the present disclosure is directed to an autonomous vehicle. The autonomous vehicle includes: at least one sensor configured to capture sensor data descriptive of a scene surrounding the autonomous vehicle, wherein the scene comprises a dynamic object. The autonomous vehicle include a computing system that includes: one or more processors; and one or more non-transitory computer-readable media that collectively store: a machine-learned object motion prediction model configured to generate probabilistic predictions for object motion over a plurality of time steps; and instructions that, when executed by the one or more processors, cause the computing system to perform operations. The operations include: processing the sensor data to identify one or more observed locations of the dynamic object within in the scene; generating a scene rasterization that describes the scene that includes the dynamic object, wherein the scene rasterization encodes the one or more observed locations of the dynamic object; processing the scene rasterization with the machine-learned object motion prediction model to generate a plurality of probabilistic predictions respectively for the plurality of time steps, wherein the probabilistic prediction generated for each time step provides a respective probability distribution for a respective future location of the dynamic object at such time step; and generating a motion plan for the autonomous vehicle based at least in part on plurality of probabilistic predictions, wherein generating the motion plan for the autonomous vehicle comprises evaluating one or more cost functions using the plurality of probabilistic predictions; and controlling motion of the autonomous vehicle based at least in part on the motion plan.

Another example aspect of the present disclosure is directed to computer-implemented method for object motion prediction. The method includes: obtaining data that describes a scene surrounding an autonomous vehicle, wherein the scene includes a dynamic object; generating a scene rasterization that encodes one or more historically observed locations of the dynamic object within the scene; and processing the scene rasterization with a machine-learned object motion prediction model to generate a plurality of probabilistic predictions respectively for a plurality of time steps, wherein the probabilistic prediction generated for each time step provides a respective probability distribution for a respective future location of the dynamic object at such time step.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Generally, the present disclosure is directed to systems and methods that probabilistically predict dynamic object behavior. In particular, in contrast to existing systems which attempt to predict object trajectories directly (e.g., directly predict a specific sequence of well-defined states), the present disclosure instead leverages a probabilistic approach, predicting discrete probability distributions over object state at each of a plurality of time steps. In one example, the present disclosure provides systems and methods that predict future states of dynamic objects (e.g., pedestrians) such that an autonomous vehicle can plan safer actions/movement.

Figure 1C:
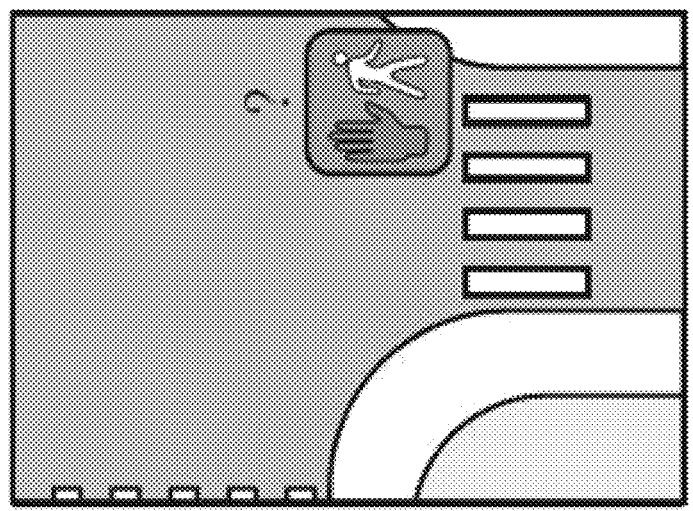
FIGS. 1A-C depict graphical diagrams of example challenging urban scenarios for pedestrian prediction according to example embodiments of the present disclosure.
Figure 1B:
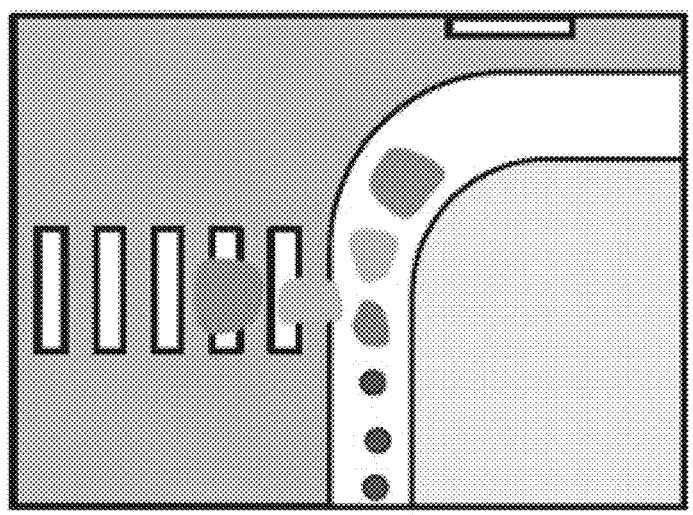

More particularly, one example application of the object motion prediction systems described herein is to predict the motion or behavior of human pedestrians in furtherance of autonomous vehicle operation. Capturing beliefs over future pedestrian states in realistic city environments for an autonomy task is a significantly challenging problem. As examples, FIGS. 1A-C depict graphical diagrams of example challenging urban scenarios for pedestrian prediction, with observations of a pedestrian (red circles) and a posterior distribution over future location (red/orange/blue at different future time horizons).

Figure 1A:
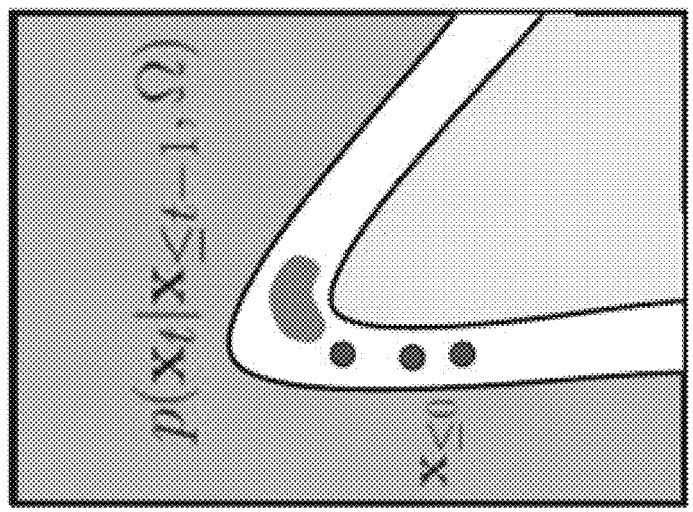

Specifically, referring to FIG. 1A, Gaussian distributions often poorly fit even unimodal pedestrian posteriors, which often exhibit scene-sensitive behaviors (e.g., behaviors that are a function of the specific semantic context included in the scene). This motivates a non-Gaussian posterior. Further, referring to FIG. 1B, future behaviors are inherently multi-modal over moderate timescales in urban environments: Pedestrians can move in arbitrary directions and change high level decisions quickly. As one example, as illustrated in FIG. 1B, the pedestrian may cross a crosswalk or continue along a sidewalk, and the historical observations cannot invalidate either mode.

Additionally, pedestrian motion prediction often involves partially observed, uncertain environments. In particular, even with strong evidence that a pedestrian intends to take a particular high level action, such as crossing a road, partially observed environments increase uncertainty in when the pedestrian will execute the action. As an example, in FIG. 2C, even with knowledge that a pedestrian intends to cross the street, predicting a specific crossing time is difficult when a crosswalk signal is unknown. Because a motion planning system of an autonomous vehicle typically operates using predictions which are associated with time, temporally-uncertain knowledge of pedestrian goals provides diminished value.

Additional challenges include: how to efficiently integrate spatial and temporal information into model input; the mixed continuous-discrete nature of trajectories, beliefs, and occupancy maps; and availability of realistic data.

In response to these challenges, the present disclosure proposes to model the moving behavior of a dynamic object (e.g., pedestrian) via a categorical distribution, predicted at each time step over a discretized spatial space.

In particular, one aspect of the present disclosure is directed to techniques which enable historical information (e.g., historically observed locations/behavior) regarding the dynamic object to be structured in a useful, discrete format referred to as a scene rasterization. This process can be referred to as rasterization and can generate a multi-channel image as the output.

In particular, in one example, an object motion prediction system can generate a scene rasterization that encodes characteristics of a scene that includes a dynamic object. For example, the scene rasterization can be generated based on sensor data collected by one or more sensors of an autonomous vehicle. As another example, the dynamic object can be a human pedestrian, animal, bicyclist, another vehicle, and/or any other objects capable of moving or being moved.

The scene rasterization can include a plurality of discrete portions that correspond to different locations within the scene. For example, the scene rasterization can be discrete representation of the scene such as, as one example, a bird's eye view representation such as a 2D grid of cells. The cells can be uniformly sized or not uniformly sized. The cells can be overlapping or not overlapping.

According to an aspect of the present disclosure, the scene rasterization can encode various information about the scene, including, as examples, semantic information about each location within the scene (e.g., road vs. sidewalk, traffic light state, etc.) and information about the current and/or past locations of the dynamic object.

Another aspect of the present disclosure is directed to a general probabilistic framework which can be embodied by a machine-learned motion prediction model. In particular, in one example, an object motion prediction system can include and use a machine-learned object motion prediction model that is configured to receive and process the scene rasterization to generate a plurality of probabilistic predictions respectively for a plurality of time steps. Specifically, the probabilistic prediction generated for each time step can provide a respective probability distribution for a respective future location of the dynamic object at such time step.

As one example, the machine-learned object motion prediction model can include a backbone portion and a prediction head. The backbone portion (e.g., which can be a deep neural network) can receive and process the scene rasterization to generate a feature map. The prediction head can receive and process the feature map to generate the plurality of probabilistic predictions. Thus, the prediction head can leverage the extracted features to predict a categorical distribution.

According to another aspect of the present disclosure, the prediction head can be a discrete residual prediction head that autoregressively generates the plurality of probability distributions for the plurality of time steps based on the feature map. In such fashion, each probability distribution can be conditioned on the previous probability distribution from previous time step(s).

As one example, the prediction head can be a discrete residual flow head that, for each time step, takes the feature map and a previous potential from a previous time step as input and predicts a residual update to the previous potential from the previous time step. As another example, the discrete residual prediction head can be a discrete residual refinement head that, for each time step, takes the log normalized version of the feature map and log normalized version of the previous potential from the previous time step as input and predicts a refinement update to an initialized potential for the current time step. As yet another example, the backbone portion of the machine-learned object motion prediction model can be a feature pyramid network.

As alternative examples, the machine-learned object motion prediction model can be or include a time-independent CNN or a ConvLSTM.

In one example, the machine-learned object motion prediction model can be trained or have been trained on a training dataset that includes descriptions of observed sequences of object movement. For example, the machine-learned object motion prediction model can be supplied with a first portion of an observed sequence of object movement of a dynamic object and can produce probabilistic predictions for a remainder of the observed sequence of object movement. A loss function can compare the probabilistic predictions to the actual ground truth remainder of the observed sequence of object movement. For example, the loss function can evaluate a negative log likelihood of the observed sequences of object movement described by the set of training data. The parameter values of the machine-learned object motion prediction model can be iteratively updated (e.g., via gradient-based techniques) to minimize the loss function.

Among other possible applications, the probabilistic predictions produced by the machine-learned object motion prediction model can be used as input to an autonomous vehicle control system. Stated differently, an autonomous vehicle can be controlled based on the predictions regarding where the dynamic object will be at a number of future times (e.g., to avoid colliding with the dynamic object at such future times). As one example, the probabilistic predictions can be directly used, for example, for cost-based self-driving vehicle planning (e.g., which includes evaluation of one or more cost functions using the probabilistic predictions). The improved ability to predict the future locations of objects correspondingly improves autonomous vehicle motion control as relates to such dynamic objects.

Thus, example aspects of the present disclosure condition a probabilistic prediction of object motion on a spatio-temporal rasterization of agent histories aligned to a local map. Specifically, in some implementations, a deep convolutional neural architecture can be leveraged for implicit multi-agent reasoning and human dynamics can be mimicked through a discrete residual flow network.

The systems and methods described herein provide a number of technical effects and benefits. As one example, the present disclosure provides a deep probabilistic formulation of pedestrian motion prediction where the joint distribution over future spatial locations is factorized in an autoregressive manner. As another example, the present disclosure proposes a rasterization process which encodes a bird's eye view of historical information including multi-actor interactions, map, and temporal history. In addition, the effectiveness of the proposed approach has been experimentally demonstrated. Example experimental results are contained in U.S. Provisional Patent Application No. 62/800,435, which is hereby incorporated by reference in its entirety.

As another example technical effect and benefit, the disclosed technology provides for improved prediction of the motion of dynamic objects. Object motion prediction for autonomous vehicle applications can require a substantial amount of processing power and analytical precision to yield effective and accurate results. The disclosed technology employs object motion prediction techniques that can provide substantial improvements to that end by employing machine-learned models. Object motion prediction systems and methods incorporating such technology can be improved in a manner that yields more accurate and robust prediction performance, thus yielding improved motion planning and navigation for autonomous vehicles.

The utilization of one or more machine-learned models can yield more effective performance in comparison to other approaches including rules-based determination systems. In addition, machine-learned models incorporated within an object motion prediction system can improve scalability and can greatly reduce the research time needed relative to development of hand-crafted rules. For example, for manually created (e.g., rules conceived and written by one or more humans) object motion prediction rules, a rule designer may need to derive heuristic models of how different objects may exhibit different properties and/or attributes in different scenarios. Further, it can be difficult to manually create rules that effectively address all possible scenarios that a vehicle (e.g., an autonomous vehicle) may encounter relative to vehicles and other detected objects. By contrast, the disclosed technology, through use of machine-learned models, can train a model on training data, which can be done at a scale proportional to the available resources of the training system (e.g., a massive scale of training data can be used to train the machine-learned model). Further, the machine-learned models can easily be revised as new training data is made available. As such, use of a machine-learned model trained on labeled sensor data can provide a scalable and customizable solution.

As such, the improved object motion prediction features disclosed herein lead to improved safety for passengers and/or cargo in autonomous vehicles and to pedestrians and other vehicles. Further, the disclosed technology can achieve improved fuel economy by requiring less sudden braking and other energy inefficient maneuvers caused by inaccurate or imprecise prediction object motion within the environment surrounding an autonomous vehicle. Additionally, the disclosed technology can result in more efficient utilization of computational resources due to the improvements in processing data and implementing object motion prediction that come through use of one or more of the disclosed techniques.

The disclosed technology can also improve the operational performance and safety of an autonomous vehicle by reducing the amount of wear and tear on vehicle components through more gradual braking based on improved prediction of the motion/locations of objects of interest. For example, more effective prediction of the motion/locations of objects of interest by the vehicle computing system can allow for a smoother ride that reduces the amount of strain on the vehicle's engine, braking, and/or steering systems, thereby improving vehicle performance and safety.

With reference now to the figures, example embodiments of the present disclosure will be discussed in further detail.

Example Vehicle Control System

Figure 2:
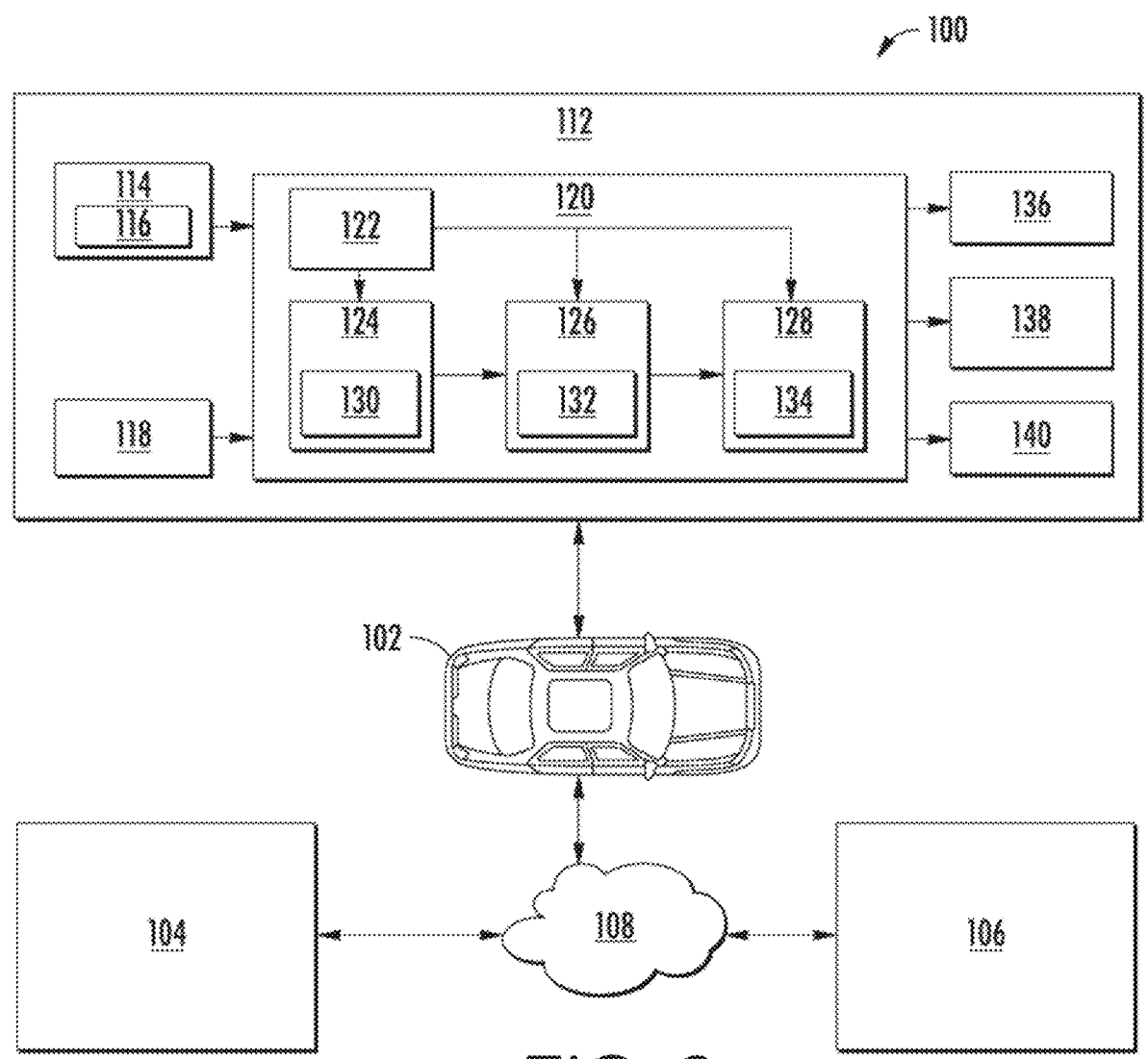
FIG. 2 depicts a block diagram of an example system for controlling the navigation of a vehicle according to example embodiments of the present disclosure.

FIG. 2 depicts a block diagram of an example system 100 for controlling the navigation of a vehicle according to example embodiments of the present disclosure. As illustrated, FIG. 2 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, a bike, a scooter and/or another type of vehicle or light electric vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 2, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle control system that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 3:
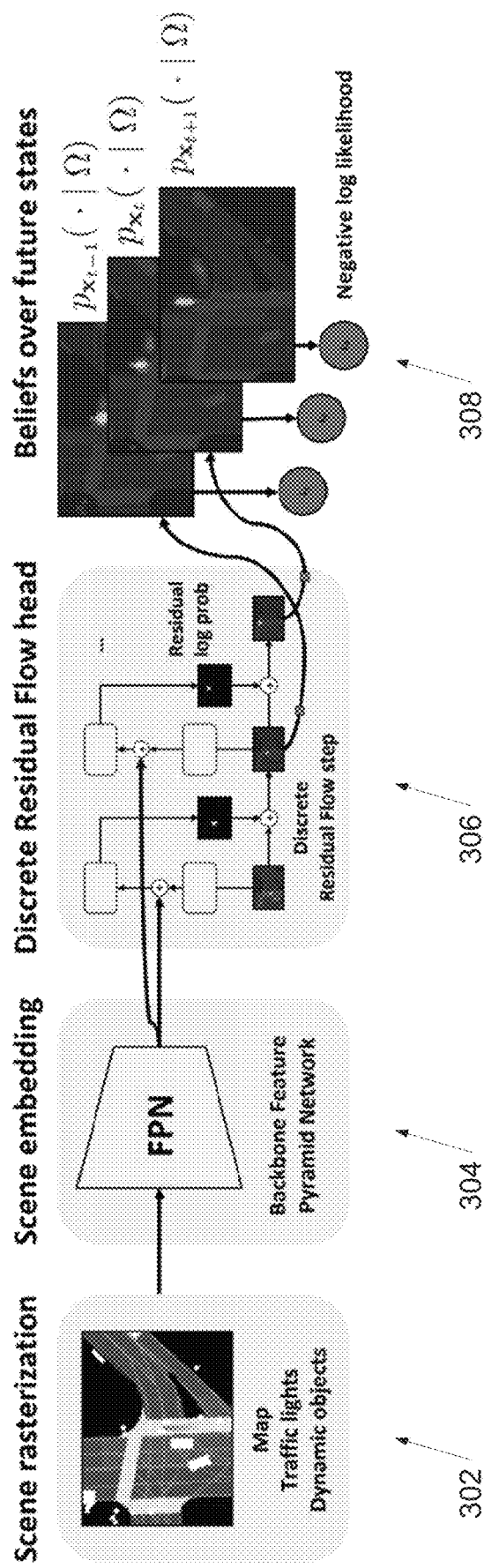
FIG. 3 depicts a graphical diagram of an example object motion prediction model according to example embodiments of the present disclosure.

Referring still to FIG. 2, vehicle computing system 112 of FIG. 2 can be configured to receive output(s) from an object motion prediction system, such as, for example, the system illustrated in FIG. 3. For example, output(s) can be provided to or produced in cooperation with one or more of the perception system 124, prediction system 126, motion planning system 128, and vehicle control system 138 to implement additional autonomy processing functionality based on the output(s). For example, motion planning system 128 of FIG. 2 can determine a motion plan for the autonomous vehicle (e.g., vehicle 102) based at least in part on the output(s) of the system illustrated in FIG. 3. Stated differently, given information about the current locations of objects detected via the output(s) and/or predicted future locations and/or moving probability distributions of proximate objects detected via the output(s), the motion planning system 128 can determine a motion plan for the autonomous vehicle (e.g., vehicle 102) that best navigates the autonomous vehicle (e.g., vehicle 102) along a determined travel route relative to the objects at such (predicted) locations. The motion planning system 128 then can provide the selected motion plan to a vehicle control system 138 that controls one or more vehicle controls (e.g., actuators or other devices that control gas flow, steering, braking, etc.) to execute the selected motion plan.

Example Discrete Residual Flow Network

FIG. 3 depicts a graphical diagram of an example object motion prediction system architecture according to example embodiments of the present disclosure. In particular, FIG. 3 illustrates an example discrete residual flow network applied to predict future pedestrian locations. Although FIG. 3 is discussed with reference to pedestrians, the motion of any dynamic object can be predicted.

Referring to FIG. 3, in a scene rasterization stage 302, observations of dynamic objects and an Pedestrian of Interest (PoI) are aligned with a semantic map, creating a scene rasterization. In a scene embedding stage 304, a multi-scale backbone Feature Pyramid Network jointly reasons over spatial and temporal information in the rasterization, embedding context into a feature map F. In a prediction stage 306, a Discrete Residual Flow prediction head autoregressively adapts an initial distribution to predict future distributions over discrete pedestrian states over long time horizons. Stage 308 shows beliefs over future states at different time steps, which at a training stage, can be compared to ground truth locations (e.g., via negative log likelihood) to facilitate training.

First, additional details will be provided for the rasterization process shown at 302. Future pedestrian actions are highly correlated with historical actions. However, actions also largely influenced by other factors like road surface types, traffic signals, static objects, vehicles, and other pedestrians. In order to efficiently represent all these factors, example implementations of the present disclosure operate to rasterize all semantic map information and agent observations into a 3D tensor, encoding both spatial and temporal information. The first two dimensions can correspond to the spatial domain whereas the third dimension can correspond to channels. Each channel can be regarded as an image which encodes information (e.g., represented in a bird's eye view) around the actor to be predicted. As one specific example, each channel can be of size H×W where H=576, W=416, with a spatial resolution of 8 pixels per meter.

Example Techniques for Representing Historical Information

Figure 4C:
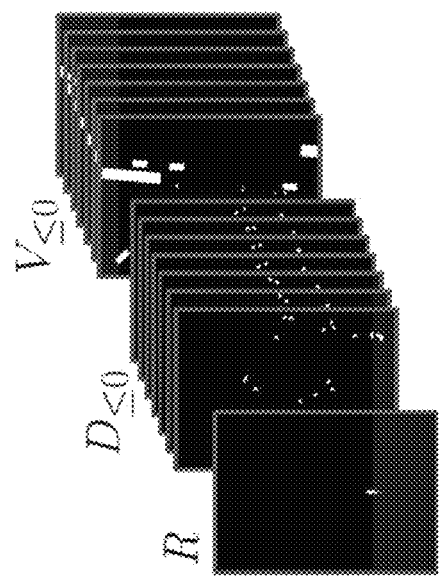
FIGS. 4A-C depict example aspects of a scene rasterization process according to example embodiments of the present disclosure.
Figure 4B:
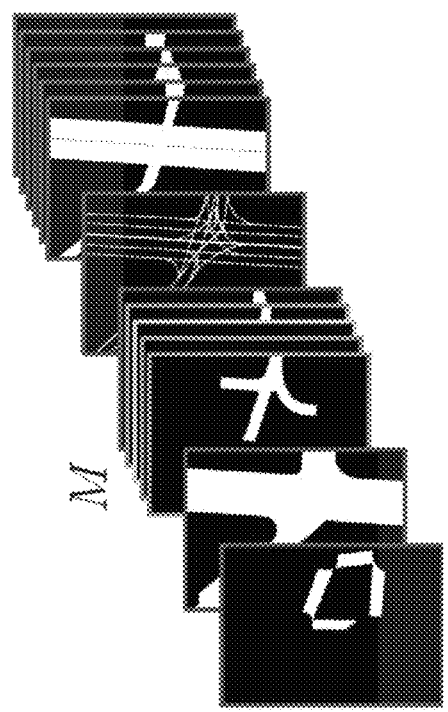
Figure 4A:
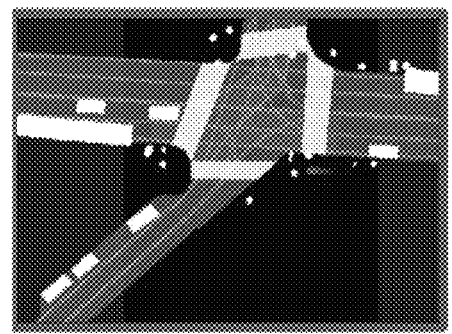

Example implementations of the present disclosure rasterize static map elements, dynamic objects, and world travers ability signals (e.g., traffic lights) into a shared spatial representation and augment this representation with spatio-temporal encodings of actor motion to generate a combined input. As examples, FIGS. 4A-C provide example scene history and context representations. Specifically, FIG. 4A shows an aggregated rasterization (dynamic objects at t=0); FIG. 4B shows semantic map channels (e.g., crossings, road mask, lights lanes, etc.); and FIG. 4C shows PoI and dynamic object history (subset of timesteps shown).

Detection and Tracking of Actors: Some example implementations can use an object detector in order to obtain reliable bounding boxes of dynamic agents. Various object detectors are known and available in the art. One example object detector is described in Liang et al. Deep continuous fusion for multi-sensor 3d object detection. In *Proceedings of the European Conference on Computer Vision (ECCV)*, pages 641-656, 2018, which exploits LiDAR point clouds as well as cameras in an end-to-end fashion. In addition, some implementations can associate the object detections using a matching algorithm and refine the trajectories using an Unscented Kalman Filter.

Historical Movement of Actors: Some example implementations can denote the current timestep as 0 and consider a history of past timesteps (E.g., $T_p=30$, where 200 ms elapse between timesteps). At any past time t, a binary image $D_t$ can be created for pedestrian occupancy where pixel $D_{t,i,j}=1$ when pixel i,j lies within a convex, bounding octagon of a pedestrian's centroid. Other cells can be encoded as 0. A binary image $V_t$ can also be created which has non-zero values in the spatial bounding polygons of vehicles, bicycles, buses and other non-pedestrian actors. To discriminate the pedestrian of interest (PoI) from other actors, a grayscale image $R_{\leq 0}$ can be created to mask the tracklet of the pedestrian to be predicted. If a pixel i, j is contained within the bounding polygon for the PoI at timestep $t \leq 0$, then $R_{\leq 0,i,j}$ $1+t/\gamma$. Thus, grayscale can be used to show motion which decays over time. FIG. 4C shows one example of how temporal information can be encoded in the channel dimension of tensors D and V.

Semantic Map: To represent the scene context of the pedestrian, a number (e.g., 15) of semantic map channels can be created, collectively denoted as M, where each channel corresponds to a finely differentiated urban surface label. Crosswalks and drivable surfaces (e.g., roadways and intersections) are rasterized into separate channels. While sidewalks may or may not be explicitly encoded, non-drivable surfaces are implied by the map. Four channels can be used to indicate traffic light state: the green, red, and yellow light channels each fill the lanes passing through intersections controlled by the corresponding light state, and lanes in intersections controlled by a light of unknown state are filled in the last channel. Similarly, lanes leading to yield or stop signs can be encoded into channels. Finally, other detailed lanes can optionally be encoded as well, such as turn lanes, bike lanes, and bus lanes, and/or a combined channel for all lane markers.

One example final rasterization is $\Omega=[D_{\leq 0}, V_{\leq 0}, R_{\leq 0}, M]$ where [·] indicates concatenation and the subscript ≤0 indicates a collection of elements from timestep $-T_p$ to 0. All these channels can optionally be rotated accordingly such that the currently observed PoI is oriented toward the top of the scene. Orientation can be computed with the last two observed locations.

Example Techniques for Probabilistic Actor State Prediction

This section now describes the probabilistic formulation for predicting the future state of the actor, i.e., the spatial location of the PoI. Given the aforementioned rasterization 2, one objective is to infer a predictive posterior distribution over possible spatial locations of the PoI for each timestep t where $t=1, \ldots, T_f$. Instead of treating the state as a continuous random variable, example implementations can discretize the spatial space which permits one-hot encoding. Specifically, the space can be split into a grid with K total number bins. The state at time t, denoted as $x_t$, is a discrete random variable which takes one of the K possible bins. Some example implementations can compute the joint probability of the states of the future $T_f$ timesteps, i.e., $p(x_t, \ldots, x_{T_f}|\Omega)$.

To make the computation tractable, this joint probability can be factorized in several ways. One example factorization assumes full independence of future timesteps, $$p(x_t, \ldots, x_{T_f}|\Omega) = \prod_{t=1}^{T_f} p(x_t|\Omega) \quad (1)$$

Example implementations employ a neural network (e.g., a convolutional neural network) to directly model the conditional distribution $p(x_t|\Omega)$.

A second example factorization follows an autoregressive fashion $$(x_t, \ldots, x_{T_f}|\Omega) = \prod_{t=1}^{T_f} p(x_t|x_{\leq t-1}, \Omega) \quad (2)$$

This factorization provides the foundation for many possible models, including the proposed DRF-NET. Another possible model various is a ConvLSTM cell function to model $p(x_t|x_{\leq t-1}, \Omega)$ directly, updating hidden state autoregressively.

Example DRF-Nets

This section describes in detail example implementations which can be referred to as Discrete Residual Flow Networks.

Example Backbone Network: Some example implementations can use a use a deep residual network (e.g., with 18 convolutional layers such as (ResNet-18)) to extract feature from the rasterization $\Omega$. From intermediate ResNet-18 layers, four feature maps at ¼, ⅛, 1/16 and 1/16 of the resolution of the input $\Omega$ can be taken, and are aggregated to ¼ resolution with a feature pyramid network (FPN).

Autoregressive Model with Discrete Residual Flow: Following the autoregressive factorization in Eq. (2), some example models can recursively construct $p(x_t|x_{\leq t-1}, \Omega)$ based on $p(x_{t-1}|x_{\leq t-2}, \Omega)$. Relying on the definition of conditional probability:

$$p(x_t|x_{\leq t-1}, \Omega) = p(x_{t-1}|x_{\leq t-2}, \Omega)\frac{p(x_t, x_{t-1}|x_{\leq t-2}, \Omega)}{p(x_{t-1}|x_{\leq t-2}, \Omega)^2}, \quad (3)$$
$$= p(x_{t-1}|x_{\leq t-2}, \Omega)r(x_t, x_{t-1}|x_{\leq t-2}, \Omega)$$

where the second term on the right hand side of the equation is referred to as a residual and denoted as $r(x_t, x_{t-1}|x_{\leq t-2}, \Omega)$. While r is applied as a scaling factor in Eq. (3), the residual becomes more natural to understand when the recursive definition is expressed in the log domain:

$$\log p(x_t|x_{\leq t-1},\Omega)=\log p(x_{t-1}|x_{\leq t-2},\Omega)+\log r(x_t,x_{t-1}|x_{\leq t-2}, \Omega) \quad (4)$$

Note that the residual itself is not necessarily a valid probability distribution. Eq. (4) can be viewed as a discrete probability flow which maps from the discrete probability distribution of $x_{t-1}$ to the one of $x_t$.

Example implementations of the present disclosure use deep neural networks to instantiate the probability distributions under this framework. Specifically, at the future timestep t, one can define, $$p(x_t \mid x_{\leq t-1}, \Omega) = \frac{1}{Z_t} \phi_t(x_{\leq t}, \Omega) \quad (5)$$

where $Z_t = \Sigma_{x_t}(x_{\leq t}, \Omega)$ is the normalization constant and $\phi_t$ can be regarded as a potential function. $\phi_t(x_{\leq t}, \Omega)$ is a potential over states. In some implementations, for initialization, $\phi_0(x_0)$ can be constructed from the t=0 observation with high value at the PoI detection and near-zero value over other states.

Thus, for any timestep t≥1, one can recursively construct, $$\phi_t(x_{\leq t}, \Omega) = \phi_{t-1}(x_{\leq t-1}, \Omega) \psi_t(x_t, x_{t-1}, \Omega) \quad (6)$$

where $\psi_{t;\theta_t}(\cdot, x_{t-1}, \Omega)$ is a sub-network with parameter $\theta_t$ and takes $x_{t-1}$ and $\Omega$ as input, which can be referred to as a residual predictor.

In some example implementations of the present disclosure, the residual predictor can be a convolutional architecture that outputs a 2D image which is compact and convenient as the states are spatial. This 2D image is queryable at state $x_t$ via indexing, as is the updated potential $\phi_t(x_{\leq t-1}, \Omega)$.

Depending on the specific form of the input, there can be at least wo variants of $\psi_{t;\theta_t}(\cdot, x_{t-1}, \Omega)$. In some example implementations, the residual predictor could take the feature map of the backbone $F(\Omega)$ and the previous $\phi_{t-1}(x_{\leq t-1}, \Omega)$ as input, which can be referred to as discrete residual flow (DRF).

Figure 5:
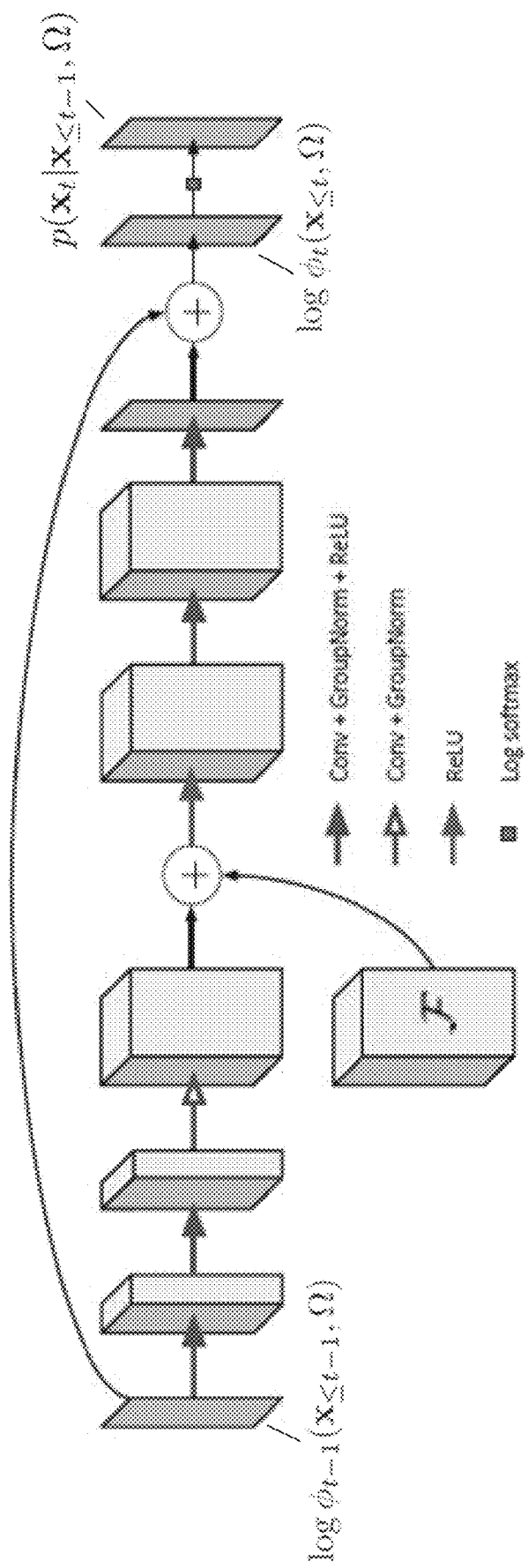
FIG. 5 depicts a graphical diagram of an example discrete residual flow network according to example embodiments of the present disclosure.

FIG. 5 shows one step of an example Discrete Residual Flow model. The log prior can be projected into a e.g., 128-channel space to update a fixed global feature map F. The updated context then predicts a residual r that is applied to the log prior. Only height and channel dimensional are depicted.

In other example implementations (e.g., alternatively to the DRF head shown in FIG. 5) the residual predictor could take the feature map and the previous log $p(x_{t-1} \mid x_{\leq t-2}, \Omega)$ as input, and refine an initialized $\phi_t(x_{\leq t}, \Omega)$, which can be referred to as discrete residual refinement.

Recalling the residual formulation in Eq. (3), we have, $$r(x_t, x_{t-1} \mid x_{\leq t-2}, \Omega) = \frac{Z_{t-1}}{Z_t} \psi_t(x_t, x_{t-1}, \Omega) \quad (7)$$

However, computing the probability using Eq. (4) and Eq. (7) is challenging due to the fact that we need to explicitly maintain the sequence of normalization constants. Therefore, the following alternative formulation can be used, $$\log p(x_t \mid x_{\leq t-1}, \Omega) = \log \phi_{t-1}(x_{\leq t-1}, \Omega) + \log \psi_t(x_t, x_{t-1}, \Omega) - \log Z_t \quad (8)$$

where the log normalization constant log $Z_t$ could be implicitly computed by the Log Sum Exp operator once per time step. It is clear that in Eq. (8) we operate with the residual of the unnormalized probability and then normalize it whereas in Eq. (4) we operate with the residual of the probability.

The overall computation process is shown in FIG. 3. The embedding of the rasterization $F(\Omega)$ is shared at all timesteps, used by each residual predictor. The architectural details of the DRF residual predictor for one timestep is illustrated in FIG. 5.

Example Learning Techniques

In some implementations, learning of the models described herein can be performed via minimization of the negative log likelihood of the observed sequences of pedestrian movement. Specifically:

$$\min_{\Theta} -\mathbb{E}\left[\sum_{t=1}^{T_f} \log p(x_t \mid x_{\leq t-1}, \Omega)\right] \quad (9)$$

where the expectation $\mathbb{E}[\cdot]$ is taken over all possible sequences and will be approximated via mini-batches. $\Theta = \{\theta_1, \ldots, \theta_{T_f}, w\}$ where w are the parameters of the backbone.

Example Methods

Figure 6:
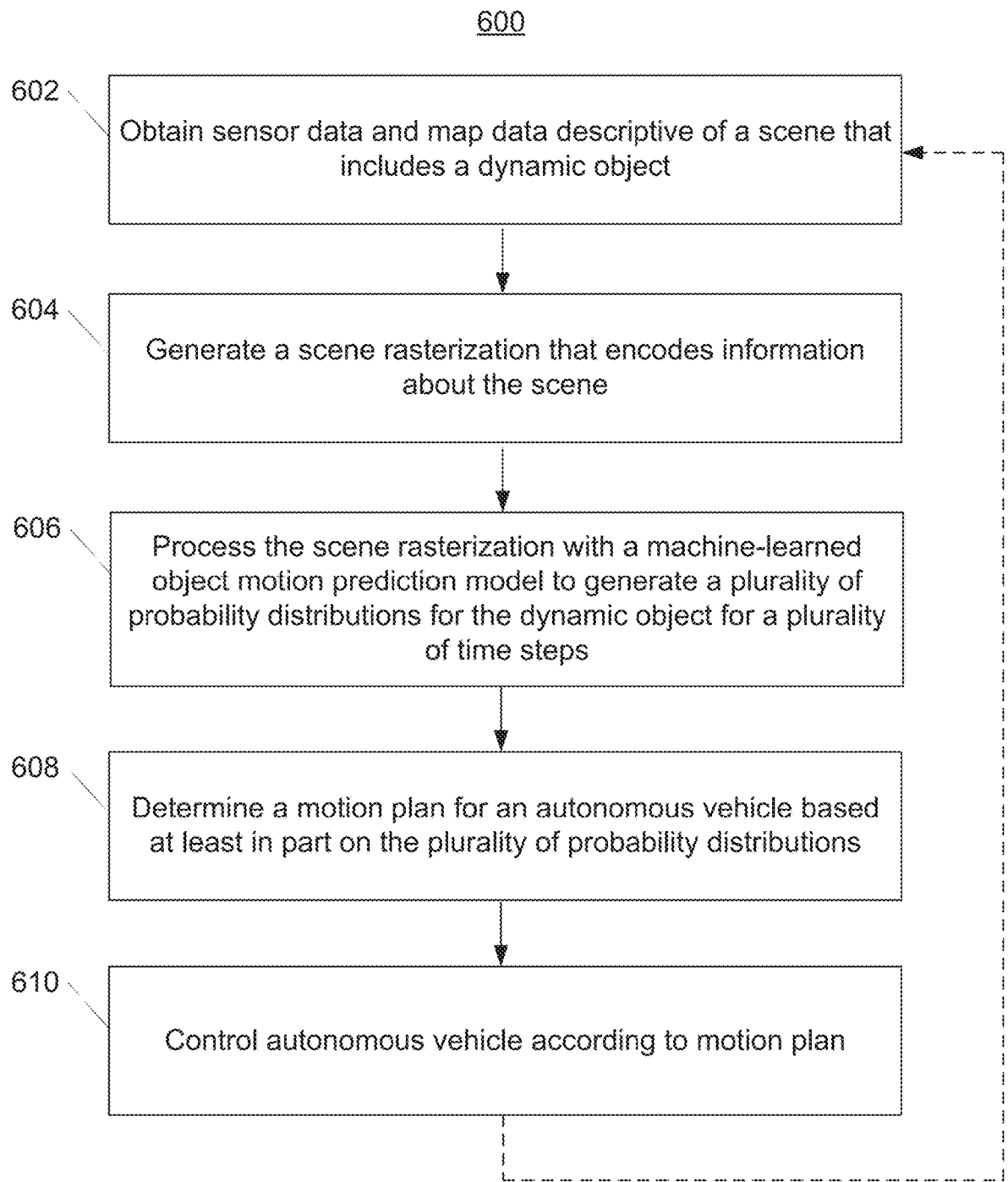
FIG. 6 depicts a flow chart diagram of an example method to perform object motion prediction according to example embodiments of the present disclosure.

FIG. 6 depicts a flow chart diagram of an example method 600 to perform object motion prediction according to example embodiments of the present disclosure.

At 602, a computing system can obtain sensor data and map data descriptive of a scene that includes a dynamic object.

At 604, the computing system can generate a scene rasterization that encodes information about the scene.

In some implementations, the scene rasterization encodes historical information about historical locations of the dynamic object within the scene.

In some implementations, the scene rasterization comprises a two-dimensional bird's eye view of the scene.

In some implementations, the scene rasterization encodes semantic information about the scene.

At 606, the computing system can process the scene rasterization with a machine-learned object motion prediction model to generate a plurality of probability distributions for the dynamic object for a plurality of time steps.

In some implementations, the machine-learned object motion prediction model can be configured to generate probabilistic predictions for object motion over a plurality of time steps.

In some implementations, the machine-learned object motion prediction model can include a backbone portion and a prediction head. In some implementations, processing the scene rasterization with the machine-learned model can include processing the scene rasterization with the backbone portion of the machine-learned object motion prediction model to generate a feature map; and processing the feature map with the prediction head of the machine-learned object motion prediction model to generate a plurality of probabilistic predictions respectively for the plurality of time steps, wherein the probabilistic prediction generated for each time step provides a respective probability distribution for a respective future location of the dynamic object at such time step.

In some implementations, the prediction head of the machine-learned object motion prediction model comprises a discrete residual prediction head that autoregressively generates the plurality of probabilistic predictions such that each of the plurality of probabilistic predictions is conditioned on the previous probabilistic predictions.

In some implementations, the discrete residual prediction head comprises a discrete residual flow head that, for each time step, takes the feature map and a previous potential from a previous time step as input and predicts a residual update to the previous potential from the previous time step.

In some implementations, the discrete residual prediction head comprises a discrete residual refinement head that, for each time step, takes a log normalized version of the feature map and log normalized version of a previous potential from a previous time step as input and predicts a refinement update to an initialized current potential for the current time step.

In some implementations, the backbone portion of the machine-learned object motion prediction model comprises a feature pyramid network.

In some implementations, the scene rasterization comprises a plurality of discrete portions; and the respective probability distribution for each time step comprises discrete probabilities respectively for the plurality of discrete portions of the scene rasterization.

As alternative examples, the machine-learned object motion prediction model can be or include a time-independent CNN or a ConvLSTM.

At 608, the computing system can determine a motion plan for an autonomous vehicle based at least in part on the plurality of probability distributions. At 610, the computing system can control an autonomous vehicle according to the motion plan. After 610, the computing system can return to 602.

Example Computing System

Figure 7:
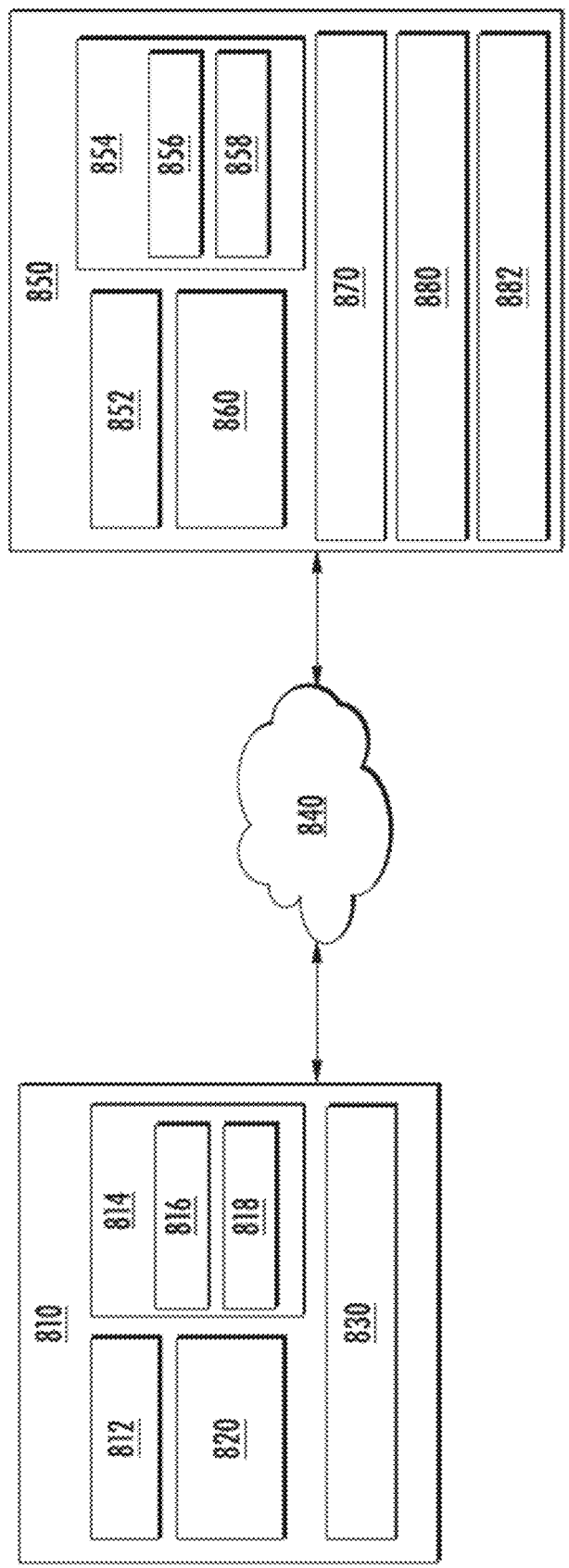
FIG. 7 depicts a block diagram of an example computing system according to example embodiments of the present disclosure.

FIG. 7 depicts a block diagram of an example computing system 800 according to example embodiments of the present disclosure. The example computing system 800 includes a computing system 810 and a machine learning computing system 850 that are communicatively coupled over a network 840.

In some implementations, the computing system 810 can perform various operations including map estimation, map fusion, sensor fusion, and object detection as described herein. In some implementations, the computing system 810 can be included in an autonomous vehicle (e.g., the vehicle 102 of FIG. 2). For example, the computing system 810 can be on-board the autonomous vehicle. In other implementations, the computing system 810 is not located on-board the autonomous vehicle. For example, the computing system 810 can operate offline to perform operations. Further, the computing system 810 can include one or more distinct physical computing devices.

The computing system 810 includes one or more processors 812 and a memory 814. The one or more processors 812 can be any suitable processing device (e.g., a processor core, a microprocessor, an ASIC, a FPGA, a controller, and/or a microcontroller) and can be one processor or a plurality of processors that are operatively connected. The memory 814 can include one or more non-transitory computer-readable storage media, including RAM, ROM, EEPROM, EPROM, one or more memory devices, flash memory devices, and/or combinations thereof.

The memory 814 can store information that can be accessed by the one or more processors 812. For instance, the memory 814 (e.g., one or more non-transitory computer-readable storage mediums, memory devices) can store data 816 that can be obtained, received, accessed, written, manipulated, created, and/or stored. The data 816 can include, for instance, data associated with the determination of object detections and intentions as described herein. In some implementations, the computing system 810 can obtain data from one or more memory devices that are remote from the system 810.

The memory 814 can also store computer-readable instructions 818 that can be executed by the one or more processors 812. The instructions 818 can be software written in any suitable programming language or can be implemented in hardware. Additionally, or alternatively, the instructions 818 can be executed in logically and/or virtually separate threads on the one or more processors 812.

For example, the memory 814 can store instructions 818 that when executed by the one or more processors 812 cause the one or more processors 812 to perform any of the operations and/or functions described herein, including, for example, determining object intentions.

According to an aspect of the present disclosure, the computing system 810 can store or include one or more machine-learned models 830. As examples, the machine-learned models 830 can be or can otherwise include various machine-learned models including, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 810 can receive the one or more machine-learned models 830 from the machine learning computing system 850 over the network 840 and can store the one or more machine-learned models 830 in the memory 814. The computing system 810 can then use or otherwise implement the one or more machine-learned models 830 (e.g., by the one or more processors 812). In particular, the computing system 810 can implement the one or more machine-learned models 830 to implement map estimation, sensor fusion, and/or object detection.

The machine learning computing system 850 includes one or more processors 852 and memory 854. The one or more processors 852 can be any suitable processing device (e.g., a processor core, a microprocessor, an ASIC, a FPGA, a controller, and/or a microcontroller) and can be one processor or a plurality of processors that are operatively connected. The memory 854 can include one or more non-transitory computer-readable storage media, including RAM, ROM, EEPROM, EPROM, one or more memory devices, flash memory devices, and/or combinations thereof.

The memory 854 can store information that can be accessed by the one or more processors 852. For instance, the memory 854 (e.g., one or more non-transitory computer-readable storage mediums, memory devices) can store data 856 that can be obtained, received, accessed, written, manipulated, created, and/or stored. The data 856 can include, for instance, data associated with the determination of the object intentions including detection outputs and forecasting outputs such as trajectory data, intent data, and/or the like as described herein. In some implementations, the machine learning computing system 850 can obtain data from one or more memory devices that are remote from the system 850.

The memory 854 can also store computer-readable instructions 858 that can be executed by the one or more processors 852. The instructions 858 can be software written in any suitable programming language or can be implemented in hardware. Additionally, or alternatively, the instructions 858 can be executed in logically and/or virtually separate threads on the one or more processors 852.

For example, the memory 854 can store instructions 858 that when executed by the one or more processors 852 cause the one or more processors 852 to perform any of the operations and/or functions described herein, including, for example, map estimation, map fusion, sensor fusion, object detection, and the like.

In some implementations, the machine learning computing system 850 includes one or more server computing devices. If the machine learning computing system 850 includes multiple server computing devices, such server computing devices can operate according to various computing architectures, including, for example, sequential computing architectures, parallel computing architectures, or some combination thereof.

In addition or alternatively to the one or more machine-learned models 830 at the computing system 810, the machine learning computing system 850 can include one or more machine-learned models 870. As examples, the one or more machine-learned models 870 can be or can otherwise include various machine-learned models including, for example, neural networks (e.g., deep convolutional neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 850 can communicate with the computing system 810 according to a client-server relationship. For example, the machine learning computing system 850 can implement the one or more machine-learned models 870 to provide a service to the computing system 810. For example, the service can provide for determining object intentions as described herein.

Thus the one or more machine-learned models 830 can be located and used at the computing system 810 and/or the one or more machine-learned models 870 can be located and used at the machine learning computing system 850.

In some implementations, the machine learning computing system 850 and/or the computing system 810 can train the machine-learned models 830 and/or 870 through use of a model trainer 880. The model trainer 880 can train the machine-learned models 830 and/or 870 using one or more training or learning algorithms. One example training technique involves implementation of the method 750 of FIG. 6. One example training technique is backwards propagation of errors. In some implementations, the model trainer 880 can perform supervised training techniques using a set of labeled training data. In other implementations, the model trainer 880 can perform unsupervised training techniques using a set of unlabeled training data. The model trainer 880 can perform a number of generalization techniques to improve the generalization capability of the models being trained. Generalization techniques include weight decays, dropouts, or other techniques.

In particular, the model trainer 880 can train the one or more machine-learned models 830 and/or the one or more machine-learned models 870 based on a set of training data 882. The training data 882 can include, for example, a set of map estimation training data for training a machine-learned map estimation model, which might include a first portion of data corresponding to LIDAR point cloud data as well as a second portion of data corresponding to labels identifying ground truth geographic prior data. In other examples, training data 882 can include a set of sensor fusion training data for training a machine-learned sensor fusion model, which might include a first portion of data corresponding to first and second data streams (e.g., an image data stream and BEV LIDAR data stream) as well as a second portion of data corresponding to labels identifying ground truth feature map data. In other examples, training data 882 can include a set of object detector training data for training a machine-learned detector model, which might include a first portion of data corresponding to LIDAR data and/or feature maps as well as a second portion of data corresponding to labels identifying ground truth detector outputs (e.g., classifications and/or bounding shapes). The model trainer 880 can be implemented in hardware, firmware, and/or software controlling one or more processors.

The computing system 810 can also include a network interface 820 used to communicate with one or more systems or devices, including systems or devices that are remotely located from the computing system 810. The network interface 820 can include any circuits, components, and/or software, for communicating with one or more networks (e.g., the network 840). In some implementations, the network interface 820 can include, for example, one or more of a communications controller, receiver, transceiver, transmitter, port, conductors, software, and/or hardware for communicating data. Similarly, the machine learning computing system 850 can include a network interface 860.

The networks 840 can be any type of network or combination of networks that allows for communication between devices. In some embodiments, the network 840 can include one or more of a local area network, wide area network, the Internet, secure network, cellular network, mesh network, peer-to-peer communication link, and/or some combination thereof, and can include any number of wired or wireless links. Communication over the network 840 can be accomplished, for instance, via a network interface using any type of protocol, protection scheme, encoding, format, and/or packaging.

FIG. 7 illustrates one example computing system 800 that can be used to implement the present disclosure. Other computing systems can be used as well. For example, in some implementations, the computing system 810 can include the model trainer 880 and the training dataset 882. In such implementations, the machine-learned models 830 can be both trained and used locally at the computing system 810. As another example, in some implementations, the computing system 810 is not connected to other computing systems.

In addition, components illustrated and/or discussed as being included in one of the computing systems 810 or 850 can instead be included in another of the computing systems 810 or 850. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 8:
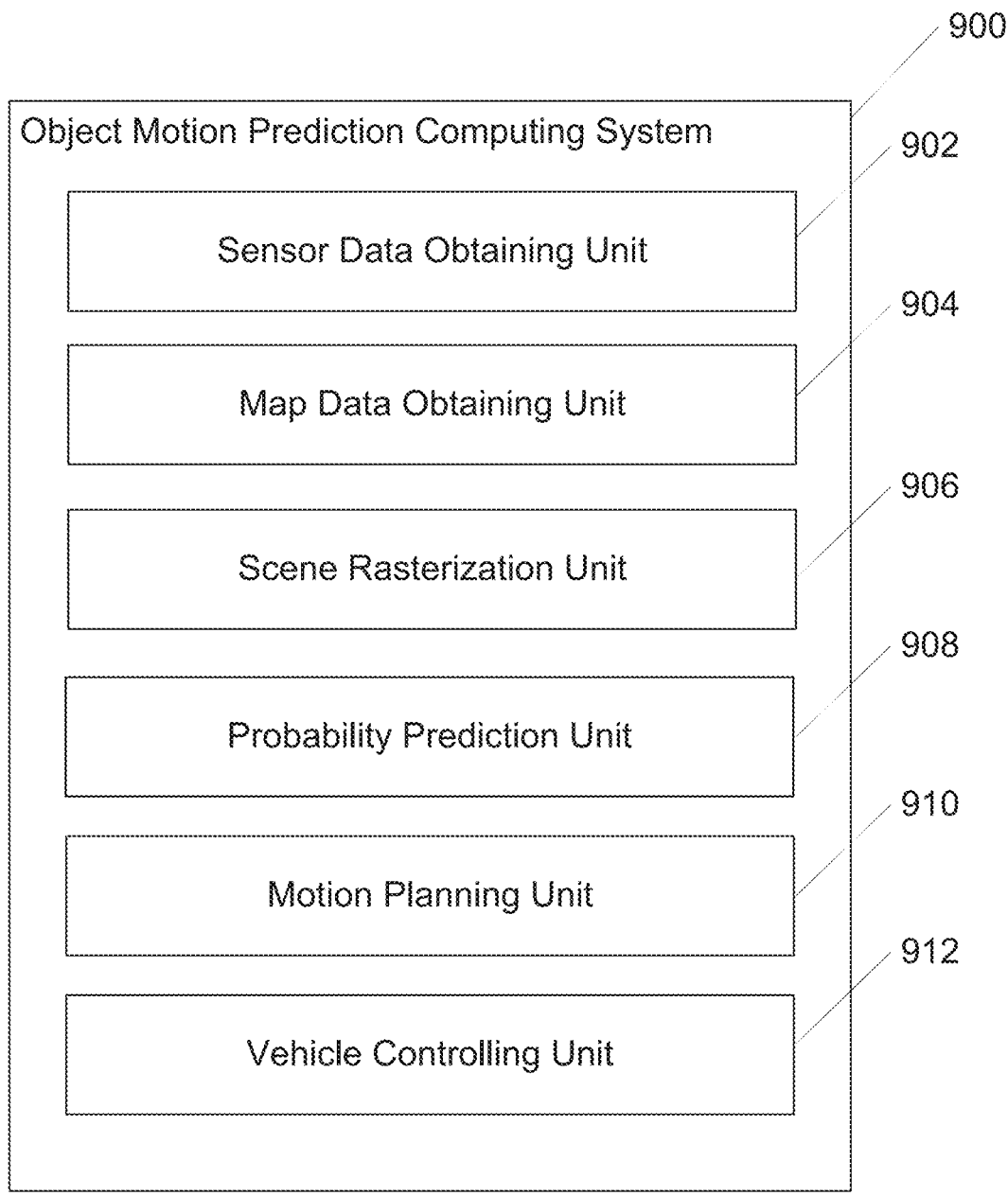
FIG. 8 depicts a block diagram of an example object motion prediction computing system according to example embodiments of the present disclosure.

Various means can be additionally or alternatively configured to perform the methods and processes described herein. FIG. 8 depicts an example system 900 with units 902-912 for performing operations and functions according to example embodiments of the present disclosure. For example, an object detection computing system 900 can include sensor data obtaining unit(s) 902, map data obtaining unit(s) 904, scene rasterization unit(s) 906, probability prediction unit(s) 908, motion planning unit(s) 910, vehicle controlling unit(s) 912, and/or other means for performing the operations and functions described herein. In some implementations, one or more of the units 902-912 may be implemented separately. In some implementations, one or more units 902-912 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data associated with an environment surrounding an autonomous vehicle. The means can be configured to project the sensor data to a bird's eye view representation of the sensor data. A sensor data obtaining unit 902 is one example of a means for obtaining such sensor data as described herein.

The means can be configured to obtain map data regarding the environment surrounding the autonomous vehicle. A map data obtaining unit 904 is one example of a means for obtaining such map data as described herein.

The means can be configured to generate scene rasterization data. A scene rasterization unit 906 is one example of a means for generating a scene rasterization as described herein.

The means can be configured to predict probabilities for future locations of an object. A probability prediction unit 908 is one example of a means for obtaining such image data as described herein.

The means can be configured to determine a motion plan for the autonomous vehicle based at least in part on the predicted probabilities. The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit 910 is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit 912 is one example of a means for controlling motion of the autonomous vehicle to execute the motion plan.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. An object motion prediction system, the object motion prediction system comprising:
   one or more processors; and
   one or more non-transitory computer-readable media that store:
      a machine-learned object motion prediction model configured to generate probabilistic predictions for object motion over a plurality of time steps, wherein the machine-learned object motion prediction model comprises a backbone portion and a prediction head; and
      instructions that are executable by the one or more processors to cause the object motion prediction system to perform operations, the operations comprising:
         obtaining a scene rasterization that describes a scene that includes a dynamic object;
         processing the scene rasterization with the backbone portion of the machine-learned object motion prediction model to generate a feature map; and
         processing the feature map with the prediction head of the machine-learned object motion prediction model to generate a plurality of probabilistic predictions respectively for the plurality of time steps, wherein the probabilistic prediction generated for a time step provides a respective probability distribution for a respective future location of the dynamic object at the time step.

2. The object motion prediction system of claim 1, wherein the prediction head of the machine-learned object motion prediction model comprises a discrete residual prediction head that autoregressively generates the plurality of probabilistic predictions such that a particular probabilistic prediction is conditioned on a previous probabilistic prediction.

3. The object motion prediction system of claim 2, wherein the discrete residual prediction head comprises a discrete residual flow head that, for the time step, takes the feature map and a previous potential from a previous time step as input and predicts a residual update to the previous potential from the previous time step.

4. The object motion prediction system of claim 2, wherein the discrete residual prediction head comprises a discrete residual refinement head that, for the time step, takes a log normalized version of the feature map and log normalized version of a previous potential from a previous time step as input and predicts a refinement update to an initialized current potential for the time step.

5. The object motion prediction system of claim 1, wherein the backbone portion of the machine-learned object motion prediction model comprises a feature pyramid network.

6. The object motion prediction system of claim 1, wherein the scene rasterization encodes historical information about historical locations of the dynamic object within the scene.

7. The object motion prediction system of claim 1, wherein the scene rasterization encodes semantic information about locations within the scene.

8. The object motion prediction system of claim 1, wherein the scene rasterization comprises a plurality of discrete portions, and wherein the respective probability distribution for the time step comprises discrete probabilities respectively for the plurality of discrete portions of the scene rasterization.

9. The object motion prediction system of claim 1, wherein the operations further comprise training the machine-learned object motion prediction model on training data, wherein training the machine-learned object motion prediction model comprises iteratively modifying parameter values of the machine-learned object motion prediction model to minimize a negative log likelihood of observed sequences of object movement described by the training data.

10. An autonomous vehicle, comprising:
at least one sensor configured to capture sensor data descriptive of a scene surrounding the autonomous vehicle, wherein the scene comprises a dynamic object; and
a computing system comprising:
one or more processors; and
one or more non-transitory computer-readable media that store:
a machine-learned object motion prediction model configured to generate probabilistic predictions for object motion over a plurality of time steps; and
instructions that are executable by the one or more processors to cause the computing system to perform operations, the operations comprising:
processing the sensor data to identify one or more observed locations of the dynamic object within the scene;
generating a scene rasterization that describes the scene that includes the dynamic object, wherein the scene rasterization encodes the one or more observed locations of the dynamic object;
processing the scene rasterization with the machine-learned object motion prediction model to generate a plurality of probabilistic predictions respectively for the plurality of time steps, wherein the probabilistic prediction generated for a time step provides a respective probability distribution for a respective future location of the dynamic object at the time step;
generating a motion plan for the autonomous vehicle based at least in part on the plurality of probabilistic predictions, wherein generating the motion plan for the autonomous vehicle comprises evaluating one or more cost functions using the plurality of probabilistic predictions; and
controlling motion of the autonomous vehicle based at least in part on the motion plan.

11. The autonomous vehicle of claim 10, wherein the machine-learned object motion prediction model comprises a discrete residual prediction head that autoregressively generates the plurality of probabilistic predictions such that a probabilistic prediction is conditioned on a previous probabilistic prediction.

12. The autonomous vehicle of claim 10, wherein the scene rasterization encodes semantic information about locations within the scene.

13. The autonomous vehicle of claim 10, wherein the respective probability distribution for the time step comprises discrete probabilities respectively for a plurality of discrete portions of the scene rasterization.

14. The autonomous vehicle of claim 10, wherein the machine-learned object motion prediction model has been trained on training data to minimize a negative log likelihood of observed sequences of object movement described by the training data.

15. A computer-implemented method for object motion prediction, the method comprising:
obtaining data that describes a scene surrounding an autonomous vehicle, wherein the scene includes a dynamic object;
generating a scene rasterization that encodes one or more historically observed locations of the dynamic object within the scene; and
processing the scene rasterization with a machine-learned object motion prediction model to generate a plurality of probabilistic predictions respectively for a plurality of time steps, wherein the probabilistic prediction generated for a time step provides a respective probability distribution for a respective future location of the dynamic object at the time step.

16. The computer-implemented method of claim 15, wherein the scene rasterization comprises a two-dimensional bird's eye view of the scene.

17. The computer-implemented method of claim 15, wherein the scene rasterization encodes semantic information about the scene.

18. The computer-implemented method of claim 15, wherein the machine-learned object motion prediction model comprises a discrete residual prediction head that autoregressively generates the plurality of probabilistic predictions such that a probabilistic prediction is conditioned on a previous probabilistic prediction.

19. The computer-implemented method of claim 18, wherein the discrete residual prediction head comprises a discrete residual flow head that takes the feature map and a previous potential from the previous time step as input.

20. The computer-implemented method of claim 18, wherein the discrete residual prediction head comprises a discrete residual refinement head that takes a log normalized version of the feature map and log normalized version of a previous potential from the previous time step as input.

* * * * *